(12) United States Patent
Yasuda et al.

(10) Patent No.: US 8,330,079 B2
(45) Date of Patent: Dec. 11, 2012

(54) STEERING WHEEL

(75) Inventors: Tetsuo Yasuda, Aichi-ken (JP);
Yoshinori Masatsugu, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 565 days.

(21) Appl. No.: 12/585,407

(22) Filed: Sep. 15, 2009

(65) Prior Publication Data

US 2010/0071502 A1    Mar. 25, 2010

(30) Foreign Application Priority Data

Sep. 25, 2008   (JP) ................. 2008-246354

(51) Int. Cl.
*B62D 1/04* (2006.01)
*B60L 1/02* (2006.01)
(52) U.S. Cl. ......................... 219/204; 74/552
(58) Field of Classification Search .............. 219/204; 75/552
See application file for complete search history.

(56) References Cited

U.S. PATENT DOCUMENTS

| 4,631,976 | A   | 12/1986 | Noda et al. |
| 2002/0033389 | A1* | 3/2002 | Sugiyama et al. ............ 219/204 |
| 2002/0036191 | A1* | 3/2002 | Bonn et al. ..................... 219/204 |
| 2011/0233183 | A1* | 9/2011 | Saunders et al. .............. 219/204 |

FOREIGN PATENT DOCUMENTS

| JP | A-2001-55150 | 2/2001 |
| JP | A-2002-104200 | 4/2002 |
| JP | A-2007-101082 | 4/2007 |
| JP | A-2007-153026 | 6/2007 |
| JP | A-2007-284033 | 11/2007 |
| JP | A-2008-010354 | 1/2008 |
| JP | A-2008-179206 | 8/2008 |
| KR | 2003-63827 | 7/2003 |

* cited by examiner

*Primary Examiner* — Matthew W Such
*Assistant Examiner* — David Spalla
(74) *Attorney, Agent, or Firm* — Posz Law Group, PLC (57) ABSTRACT

A steering wheel including a rim, first heating members, second heating members, and a control section is provided. The rim has leather-covered portions and wood-grain portions. The surface of the leather-covered portions has a thermal conductivity different from the thermal conductivity of the surface of the wood-grain portions. Each first heating member is provided inside of the surface of the corresponding leather-covered portion. When being energized, each first heating member adjusts the surface temperature of the corresponding leather-covered portion. Each second heating member is provided inside of the surface of the corresponding wood-grain portion. When being energized, each second heating member adjusts the surface temperature of the corresponding wood-grain portion. The control section controls the energization of the first heating members and the energization of the second heating members independently from each other.

5 Claims, 5 Drawing Sheets

STEERING WHEEL

BACKGROUND OF THE INVENTION

The present invention relates to a steering wheel with temperature adjustment function.

When the surface temperature of the steering wheel, for example, of a vehicle is too high or too low under the influence of the external temperature, the driver is not only disturbed when touching the steering wheel, but also cannot manipulate the steering wheel in some cases. Accordingly, several types of steering wheels with temperature adjustment function have been proposed that adjust the surface temperature of a steering wheel.

For example, Japanese Laid-Open Patent Publication No. 2008-10354 discloses a steering wheel including a ring portion and heaters. The ring portion includes synthetic resin parts and wooden parts, and the heaters raise the surface temperature of the synthetic resin parts. However, the steering wheel has no means to raise the surface temperature of the wooden parts. Thus, when the surface temperature of the wooden parts is too low, the surface temperature of the wooden parts cannot be raised. This is disadvantageous in reducing the thermal discomfort experienced by the driver when touching the steering wheel.

SUMMARY OF THE INVENTION

Accordingly, it is an objective of the present invention to provide a steering wheel that is suitable for reducing thermal discomfort experienced by the driver when touching the steering wheel.

To achieve the foregoing objective and in accordance with one aspect of the present invention, a steering wheel including a rim having surface, a first temperature adjuster, a second temperature adjuster, and a control section is provided. The rim has a first rim portion having a surface and a second rim portion having a surface. A part of the rim surface is formed by the surface of the first rim portion, and at least a part of the remainder of the rim surface is formed by the surface of the second rim portion. The surface of the first rim portion has a thermal conductivity different from the thermal conductivity of the surface of the second rim portion. The first temperature adjuster is provided inside of the surface of the first rim portion. When being energized, the first temperature adjuster adjusts the surface temperature of the first rim portion. The second temperature adjuster is provided inside of the surface of the second rim portion. When being energized, the second temperature adjuster adjusts the surface temperature of the second rim portion. The control section controls the energization of the first temperature adjuster and the energization of the second temperature adjuster independently from each other.

Other aspects and advantages of the invention will become apparent from the following description, taken in conjunction with the accompanying drawings, illustrating by way of example the principles of the invention.

DETAILED DESCRIPTION OF THE PREFERRED EMBODIMENTS

One embodiment of the present invention will now be described with reference to FIGS. 1 to 5.

Figure 1:
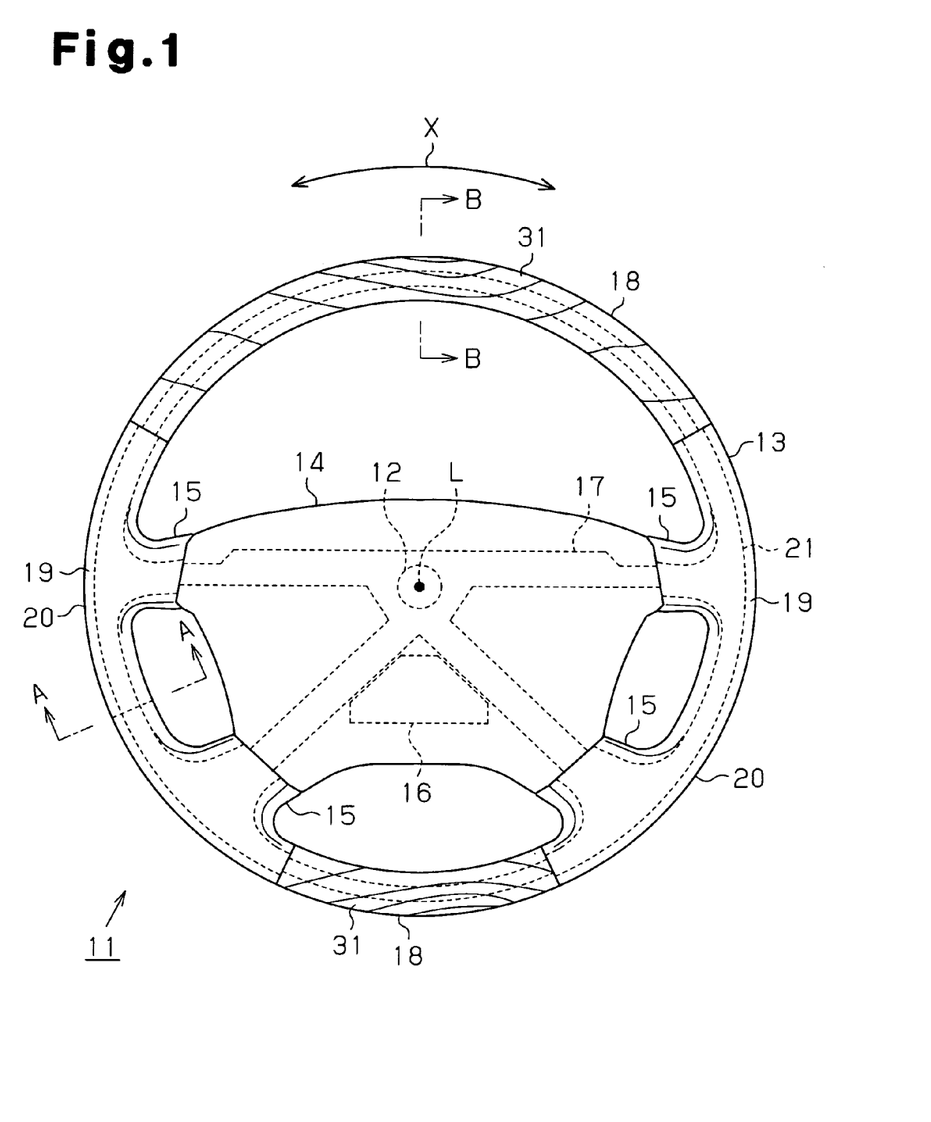
FIG. 1 is a front view illustrating a steering wheel according to one embodiment of the present invention.

A steering wheel 11 according to the present embodiment, which is shown in FIG. 1, is installed in front of the driver's seat of a vehicle. A steering shaft 12 is coupled to the center of the steering wheel 11, so as to rotate integrally with the steering wheel 11. The steering shaft 12 is coupled to steerable wheels.

The steering wheel 11 includes an annular rim 13, a pad 14, and spokes 15. The rim 13 is held by the driver when manipulating the steering wheel 11. The pad 14 is surrounded by the rim 13. The spokes 15 connect the rim 13 to the pad 14. The pad 14 incorporates an electronic control unit (ECU) 16. A core 17 is provided inside the rim 13 and the spokes 15. The pad 14 is located above a location where portions of the core 17 that correspond to the spokes 15 intersect with each other.

The rim 13 includes first rim portions, which are two leather-covered portions 20 in this embodiment, and second rim portions, which are two wood-grain portions 18 in this embodiment. The surface of each leather-covered portion 20 is formed by a leather sheet 19. The surface of each wood-grain portion 18 is formed by a pair of ornamental members 31 with wood grain finish. The leather-covered portions 20 are provided symmetrically on the right and left portions of the steering wheel 11, respectively. The wood-grain portions 18 are provided on the upper and lower portions of the steering wheel 11, respectively.

Figure 2A:
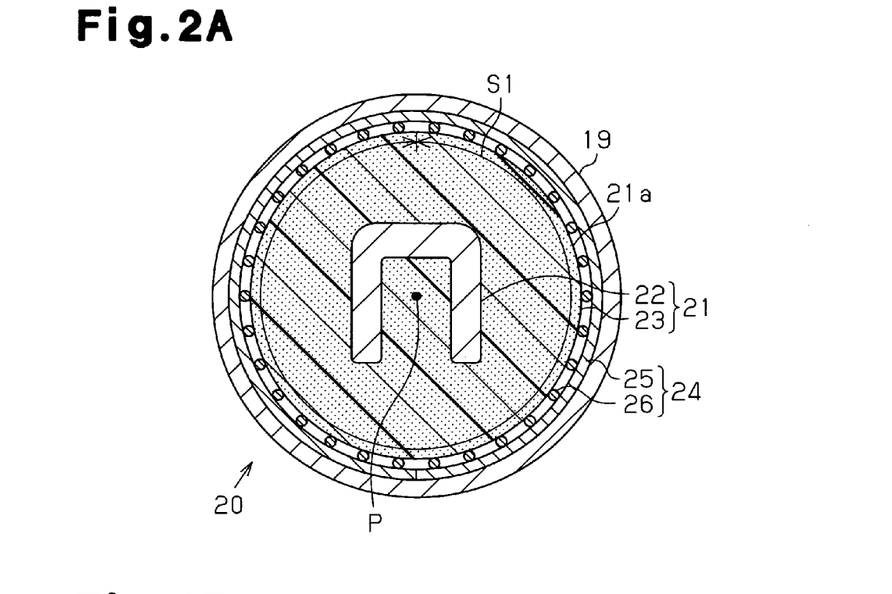
FIG. 2A is a cross-sectional view taken along line A-A of FIG. 1.

A portion of the core 17 that corresponds to the rim 13 is an annular rim core 21. The rim core 21 has a circular shape in a cross section perpendicular to the center line P of the rim core 21 as shown in FIG. 2A. The rim core 21 includes an annular core member 22 and an encompassing member 23 that encompasses the core member 22. The core member 22 has a channel-like shape opening downward in a cross section perpendicular to the center line P of the rim core 21. The encompassing member 23 is formed of a soft material (an elastic material) such as foamed polyurethane.

In each leather-covered portion 20, an outer circumference 21a of the rim core 21 is covered with a first temperature adjuster, which is a first heating member 24 in this embodiment. Each leather sheet 19 covers the outer circumference of the corresponding first heating member 24. Each first heating member 24 includes a first heat conductive sheet 25 formed of nonwoven fabric and a first heating wire 26 sewn into the first heat conductive sheet 25. Each first heat conductive sheet 25 is adhered to the inner surface of the corresponding leather sheet 19. The first heating wires 26 contact the outer circumference 21a of the rim core 21.

Figure 2B:
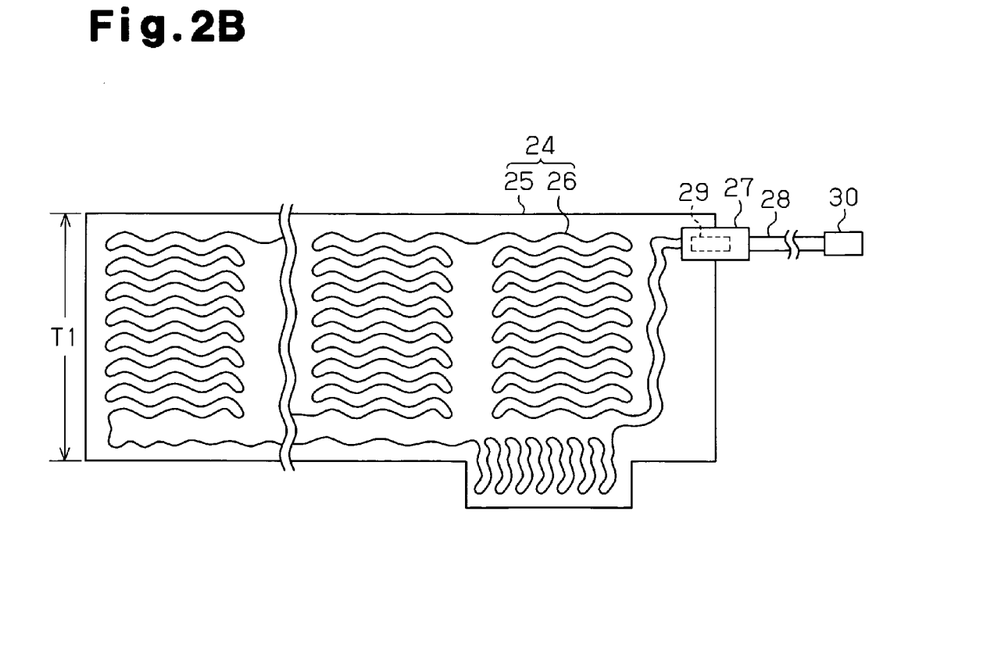
FIG. 2B is a development view showing one of first heater portions of the steering wheel shown in FIG. 1.

As shown in FIG. 2B, each first heat conductive sheet 25 has an elongated rectangular shape when developed into a flat form. The transverse dimension T1 of each first heat conductive sheet 25 is longer than the outer circumferential length S1 of the rim core 21 (see FIG. 2A). The outer circumferential length S1 of the rim core 21 refers to the circumferential length of a circle that is the shape of the rim core 21 in a cross section perpendicular to the center line P of the rim core 21. Each first heating wire 26 extends on the corresponding first heat conductive sheet 25 in a continuous wavy form, without contacting or intersecting itself over the entire length. Both ends of each first heating wire 26 are connected to a first electrical wire 28 with a first terminal 27. Each first terminal 27 has a first temperature sensing element 29, the resistance of which is lowered as the temperature increases.

In the present embodiment, each first temperature sensing element 29 is formed by a thermistor. Each first temperature sensing element 29 includes a temperature sensing portion that contacts the corresponding first heating wire 26, and outputs a voltage value that corresponds to the temperature of the first heating wire 26. The temperature sensed by each first temperature sensing element 29 is different from the surface temperature of the corresponding leather-covered portion 20. This is because the conduction of the Joule heat generated by each first heating wire 26 to the surface of the corresponding leather-covered portion 20 is influenced by the heat storage performance and thermal conductivity of the corresponding leather sheet 19.

The ends of the first electrical wires 28 that are opposite to the ends connected to the first terminals 27 are all connected to a common first connector 30. That is, although FIG. 2B shows only one of the first heating members 24 connected to the first connector 30, all the first heating members 24 of the steering wheel 11 are all electrically connected to the common first connector 30. The first connector 30 is first coupler (not shown) provided in the ECU 16.

Figure 3A:
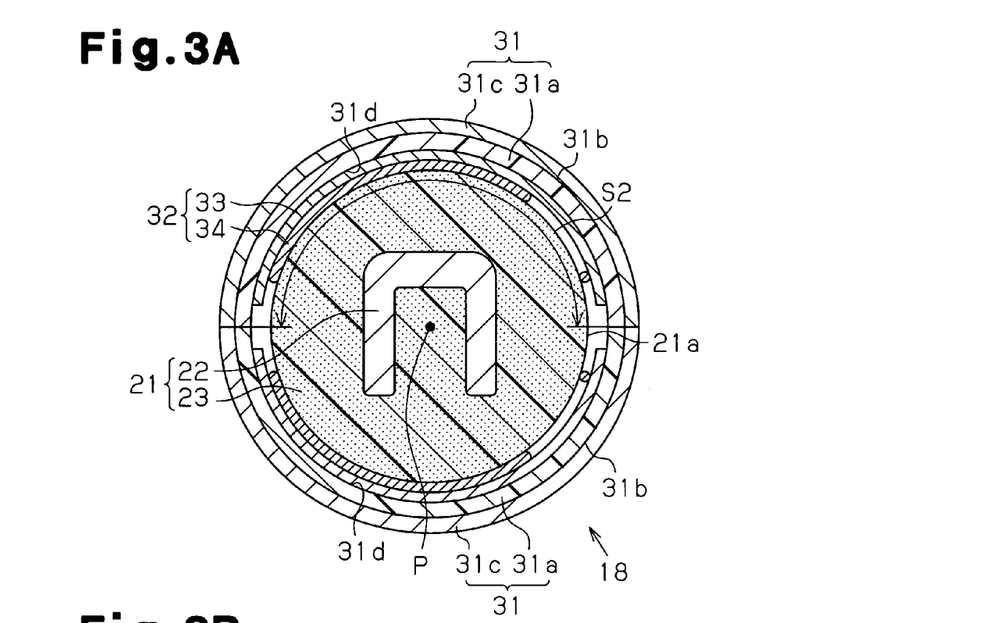
FIG. 3A is a cross-sectional view taken along line B-B of FIG. 1.

As shown in FIG. 3A, a pair of the ornamental members 31 are provided about the rim core 21 in each wood-grain portion 18. Each ornamental member 31 includes a synthetic resin base portion 31a and a wooden surface portion 31c. Each base portion 31a has a semicircular shape in a cross section perpendicular to the center line P of the rim core 21. Each surface portion 31c is bonded to an outer surface 31b of the corresponding base portion 31a. Each pair of the ornamental members 31 are joined to each other, for example, with adhesive, after being curved along the circumferential direction of the steering wheel 11 shown by double-headed arrow X in FIG. 1. The ornamental members 31 have a grater thermal conductivity than that of the leather sheets 19, and a lower thermal capacity than that of the leather sheets 19.

A second temperature adjuster, which is a second heating member 32 in this embodiment, is attached to an inner surface 31d of each ornamental member 31. Each second heating member 32 is located between the corresponding ornamental member 31 and the rim core 21. Each second heating member 32 includes a second heat conductive sheet 33 and a second heating wire 34, which is sewn into the second heat conductive sheet 33. The second heat conductive sheets 33 are formed of the same nonwoven fabric as that of the first heat conductive sheets 25 of the first heating members 24. The material of the second heating wires 34 is the same as that of the first heating wires 26 of the first heating members 24. Each second heat conductive sheet 33 is adhered to the inner surface 31d of the corresponding ornamental member 31. The second heating wires 34 contact the outer circumference 21a of the rim core 21.

Figure 3B:
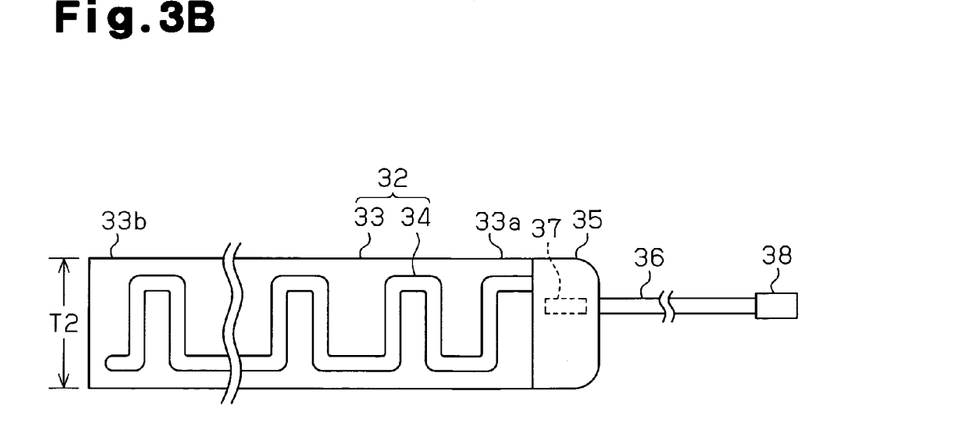
FIG. 3B is a development view showing one of second heater portions of the steering wheel shown in FIG. 1.

As shown in FIG. 3B, each second heat conductive sheet 33 has an elongated rectangular shape when developed into a flat form. The transverse dimension T2 of each second heat conductive sheet 33 is longer than the inner circumferential length S2 of the corresponding ornamental member 31 (see FIG. 3A). The inner circumferential length S2 of each ornamental member 31 refers to the length of a semicircle that is the shape of the ornamental member 31 in a cross section perpendicular to the center line P of the rim core 21. The arrangement pattern of the second heating wire 34 on each second heat conductive sheet 33 is different from the arrangement pattern of the first heating wire 26 on each first heat conductive sheet 25. Each second heating wire 34 extends from a first end 33a to a second end 33b on the corresponding second heat conductive sheet 33 while being repeatedly bent at right angle without contacting or intersecting itself, and is thereafter returned from the second end 33b to the first end 33a. Both ends of each second heating wire 34 are connected to a second electrical wire 36 with a second terminal 35. Each second terminal 35 has a second temperature sensing element 37, the resistance of which is lowered as the temperature increases.

In the present embodiment, each second temperature sensing element 37 is formed by a thermistor. Each second temperature sensing element 37 includes a temperature sensing portion that contacts the corresponding second heating wire 34, and outputs a voltage value that corresponds to the temperature of the second heating wire 34. The temperature sensed by each second temperature sensing element 37 is different from the surface temperature of the corresponding wood-grain portion 18. This is because the conduction of the Joule heat generated by each second heating wire 34 to the surface of the corresponding wood-grain portion 18 is influenced by the heat storage performance and thermal conductivity of the corresponding ornamental member 31.

The ends of the second electrical wires 36 that are opposite to the ends connected to the second terminals 35 are all connected to a common second connector 38. That is, although FIG. 3B shows only one of the second heating members 32 connected to the second connector 38, all the second heating members 32 of the steering wheel 11 are all electrically connected to the common second connector 38. The second connector 38 is second coupler (not shown) provided in the ECU 16.

Next, the electrical configuration for controlling the first heating members 24 and the second heating members 32 will be described.

Figure 4:
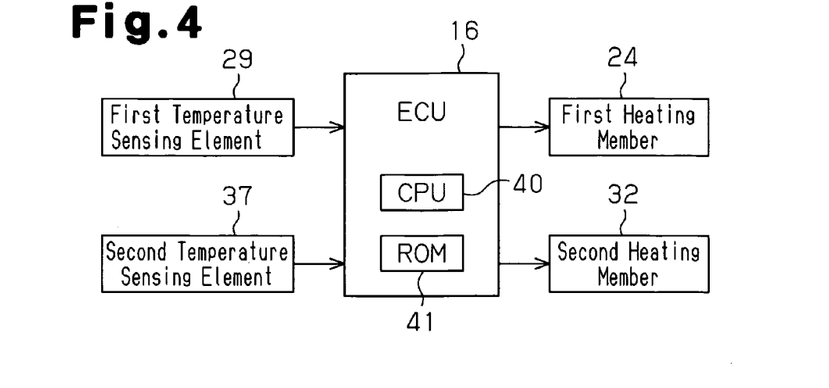
FIG. 4 is a block diagram showing the electrical configuration of the steering wheel of FIG. 1.

As shown in FIG. 4, the ECU 16 has a central processing unit (CPU) 40 and a read-only memory (ROM) 41, and controls operations of various actuators in the steering wheel 11. The ROM 41 stores data such as programs required for controlling operations of the actuators.

The ECU 16 is electrically connected to the first temperature sensing elements 29 and second temperature sensing elements 37. The ECU 16 receives a first voltage value V1, which is a voltage value outputted by each first temperature sensing element 29 in accordance with the temperature of the corresponding first heating wire 26, and a second voltage value V2, which is a voltage value outputted by each second temperature sensing element 37 in accordance with the temperature of the corresponding second heating wire 34. The ECU 16 obtains the surface temperature of each leather-covered portion 20 based on the corresponding first voltage value V1, and the surface temperature of each wood-grain portion 18 based on the corresponding second voltage values V2. The first temperature sensing elements 29 and the second temperature sensing elements 37 have the same output characteristics.

The ECU 16 is electrically connected to the first heating member 24 and the second heating member 32. The ECU 16 outputs commands independently to the first heating member 24 and the second heating member 32. When each first heating member 24 receives an actuation command from the ECU 16, the corresponding first heating wire 26 is energized with a first predetermined quantity of electricity. As a result, the Joule heat generated by the first heating wire 26 increases the surface temperature of the corresponding leather-covered portion 20. When each first heating member 24 receives a deactuation command from the ECU 16, the energization of the corresponding first heating wire 26 is stopped. On the other hand, when each second heating member 32 receives an actuation command from the ECU 16, the corresponding second heating wire 34 is energized with a second predetermined quantity of electricity, which is smaller than the first predetermined quantity of electricity. As a result, the Joule heat generated by the second heating wire 34 increases the surface temperature of the wood-grain portion 18. When each second heating member 32 receives a deactuation command from the ECU 16, the energization of the corresponding second heating wire 34 is stopped. That is, the ECU 16 has a function as a control section (control means) that controls the energization of the first heating members 24 and the second heating members 32 independently from each other.

The ROM 41 stores a first target voltage value v1, which is used for determining whether the first heating members 24 need to be activated, and a second target voltage value v2, which is used for determining whether the second heating members 32 need to be activated. The first target voltage value v1 is equal to a voltage value that is predicted, taking into consideration the heat storage performance and thermal conductivity of the leather sheets 19, to be outputted from each first temperature sensing element 29 when the surface temperature of the corresponding leather-covered portion 20 reaches a target value. The second target voltage value v2 is equal to a voltage value that is predicted, taking into consideration the heat storage performance and thermal conductivity of the ornamental members 31, to be outputted from each second temperature sensing element 37 when the surface temperature of the corresponding wood-grain portion 18 reaches a target value. The target value of the surface temperature of the leather-covered portions 20 and the target value of the surface temperature of the wood-grain portions 18 are the same value, and are set to a temperature that does not give a thermal discomfort to the driver when touching the leather-covered portions 20 or the wood-grain portions 18. Specifically, the target temperature is set to a normal body temperature, which is about 36 to 37° C.

Subsequently, the procedure in which the ECU 16 controls the energization of the first heating members 24 and the second heating members 32 will be described.

Figure 5:
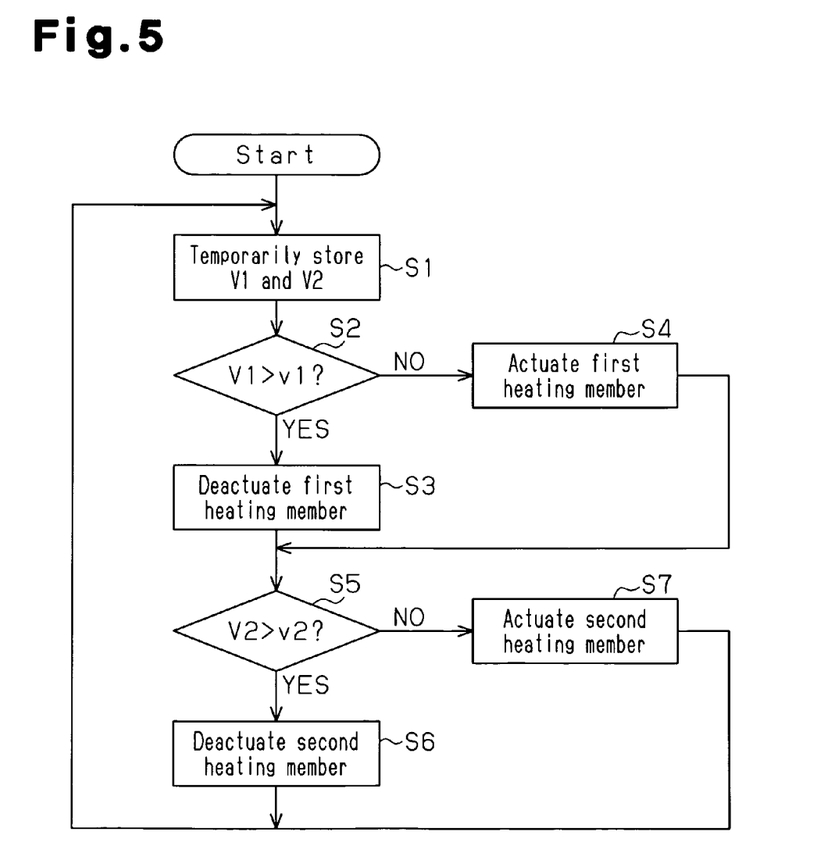
FIG. 5 is a flowchart showing a procedure for controlling the energization of the first heater portions and the second heater portions of the steering wheel shown in FIG. 1.

When the engine of the vehicle is started, the on-vehicle ECU (nor shown) sends an activation signal to the ECU 16. In response, the ECU 16 starts controlling the energization of the first heating members 24 and the second heating members 32. First, in step S1, the ECU 16 temporarily stores in the ROM 41 the first voltage values V1 sent from the first temperature sensing elements 29 and the second voltage values V2 sent from the second temperature sensing elements 37. Then, in step S2, the ECU 16 determines whether each first voltage value V1 is greater than the first target voltage value v1. When determining that any of the first voltage values V1 is greater than the first target voltage value v1, the ECU 16 proceeds to step S3 and sends a deactuation command to the corresponding first heating member 24. That is, the ECU 16 deactivates the corresponding first heating member 24. When determining that any of the first voltage values V1 is lower than or equal to the first target voltage value v1, the ECU 16 proceeds to step S4 and sends an actuation command to the corresponding first heating member 24. That is, the ECU 16 actuates the corresponding first heating member 24.

After outputting the deactuation command or the actuation command to each first heating member 24, the ECU 16 determines whether each second voltage value V2 is greater than the second target voltage value v2 in step S5. When determining that any of the second voltage values V2 is greater than the second target voltage value v2, the ECU 16 proceeds to step S6 and sends a deactuation command to the corresponding second heating member 32. That is, the ECU 16 deactivates the corresponding second heating member 32. When determining that any of the second voltage values V2 is lower than or equal to the second target voltage value v2, the ECU 16 proceeds to step S7 and sends an actuation command to the corresponding second heating member 32. That is, the ECU 16 actuates the corresponding second heating member 32.

After outputting the deactuation command or the actuation command to each second heating member 32, the ECU 16 returns to step S1. While receiving the activation signal from the on-vehicle ECU, the ECU 16 repeats the procedure represented by the flowchart of FIG. 5. Therefore, even if the energization of the first heating wire 26 of any of the first heating members 24 is stopped by a deactuation command from the ECU 16, the ECU 16 outputs an actuation command to the deactivated first heating member 24 when determining that the first voltage V1 outputted by the corresponding first temperature sensing element 29 is lower than or equal to the first target voltage value v1. Accordingly, the energization of the first heating wire 26 of the first heating member 24 is resumed. Likewise, even if the energization of the second heating wire 34 of any of the second heating members 32 is stopped by a deactuation command from the ECU 16, the ECU 16 outputs an actuation command to the deactivated second heating member 32 when determining that the second voltage V2 outputted by the corresponding second temperature sensing element 37 is lower than or equal to the second target voltage value v2. Accordingly, the energization of the second heating wire 34 of the second heating member 32 is resumed.

When the engine is stopped, the on-vehicle ECU sends a stop signal to the ECU 16. Accordingly, the ECU 16 outputs deactuation commands to the first heating members 24 and the second heating members 32 and stops controlling the energization of the first heating members 24 and the second heating members 32.

For example, when the vehicle is parked in extremely cold weather, the surface temperature of the steering wheel 11 drops under the influence of the external temperature. If the driver gets inside the vehicle and starts the engine under this condition, the ECU 16 starts controlling the energization of the first heating members 24 and the second heating members 32 as described above. As a result, Joule heat is generated in the first heating wire 26 of each first heating member 24 through the energization with the first predetermined quantity of electricity, and Joule heat is generated in the second heating wire 34 of each second heating member 32 through the energization with the second predetermined quantity of electricity. The Joule heat generated in the first heating wire 26 of each first heating member 24 is conducted to the corresponding leather sheet 19 via the corresponding first heat conductive sheet 25, thereby increasing the surface temperature of the corresponding leather-covered portion 20. The Joule heat generated in the second heating wire 34 of each second heating member 32 is conducted to the corresponding ornamental member 31 via the corresponding second heat conductive sheet 33, thereby increasing the surface temperature of the corresponding wood-grain portion 18. Therefore, the surface temperature of the leather-covered portions 20 and the surface temperature of the wood-grain portions 18 reach the same target value substantially simultaneously.

The present embodiment has the following advantages.

The ECU 16 controls the energization of the first heating members 24 provided in the leather-covered portions 20 and the energization of the second heating members 32 provided in the wood-grain portions 18, independently from each other. This facilitates reduction in the difference in surface temperature between the leather-covered portions 20 and the wood-grain portions 18. Therefore, the present embodiment is advantageous for reducing the thermal discomfort experienced by the driver when simultaneously touching any of the leather-covered portions 20 and any of the wood-grain portions 18 of the steering wheel 11.

Since the ECU 16 receives the voltage value outputted by each first temperature sensing element 29 in accordance with the temperature of the corresponding first heating wire 26, the ECU 16 can easily perform feedback control of the temperature of the corresponding first heating member 24. This advantageously allows the ECU 16 to accurately adjust the surface temperature of the leather-covered portions 20.

Since the ECU 16 receives the voltage value outputted by each second temperature sensing element 37 in accordance with the temperature of the corresponding second heating wire 34, the ECU 16 can easily perform feedback control of the temperature of the corresponding second heating member 32. This advantageously allows the ECU 16 to accurately adjust the surface temperature of the wood-grain portions 18.

The target value of the surface temperature of the leather-covered portions 20 and the target value of the wood-grain portions 18, which are used in controlling the energization of the first heating members 24 and the second heating members 32, are the same. This is particularly advantageous for reducing the thermal discomfort experienced by the driver when simultaneously touching any of the leather-covered portions 20 and any of the wood-grain portions 18 of the steering wheel 11.

The ornamental members 31 have a grater thermal conductivity than that of the leather sheets 19. Thus, the quantity of electricity that is supplied to a second heating wire 34 when the ECU 16 sends an actuation command to the corresponding second heating member 32 is set to be smaller than the quantity of electricity that is supplied to a first heating wire 26 when the ECU 16 sends an actuation command to the corresponding first heating member 24. This enables reduction in the difference between the time required for the surface temperature of the leather-covered portions 20 to reach the target temperature and the time required for the surface temperature of the wood-grain portions 18 to reach the same target temperature.

Each first heating wire 26 is attached to the inner surface of the corresponding leather sheet 19 with the first heat conductive sheet 25 made of nonwoven fabric. This prevents the driver from noticing the existence of the first heating wires 26 through a sensation other than the temperature when grasping the leather-covered portions 20.

Each second heating wire 34 is attached to the inner surface of the corresponding ornamental member 31 with the second heat conductive sheet 33 made of nonwoven fabric. This prevents the driver from noticing the existence of the second heating wires 34 through a sensation other than the temperature when grasping the wood-grain portions 18.

The above described embodiment may be modified as follows.

In step S3 of the flowchart shown in FIG. 5, instead of deactivating a first heating member 24, the ECU 16 may energize the first heating wire 26 of the first heating member 24 with a quantity of electricity smaller than the first predetermined quantity of electricity, in order to maintain the surface temperature of the corresponding leather-covered portion 20. This energization is, for example, stopped when a predetermined period of time has elapsed.

In step S5 of the flowchart shown in FIG. 5, instead of deactivating a second heating member 32, the ECU 16 may energize the second heating wire 34 of the second heating member 32 with a quantity of electricity smaller than the second predetermined quantity of electricity, in order to maintain the surface temperature of the corresponding wood-grain portion 18. This energization is, for example, stopped when a predetermined period of time has elapsed.

After step S1, the ECU 16 may simultaneously execute step S2 and step S5, that is, simultaneously perform the determination of step S2 and the determination of step S5.

The target value of the surface temperature of the leather-covered portions 20 and the target value of the surface temperature of the wood-grain portions 18, which are used in the energization control of the first heating members 24 and the second heating members 32, do not need to be the same, but may be different. However, it is preferable that the difference between the target value of the surface temperature of the leather-covered portions 20 and the target temperature of the surface temperature of the wood-grain portions 18 be within a certain range that does not give thermal discomfort to the driver when simultaneously touching any of the leather-covered portions 20 and any of the wood-grain portions 18.

The arrangement pattern of the first heating wire 26 on each first heat conductive sheet 25 is not particularly limited, and may be like a mesh.

Instead of being adhered to the inner surface of the corresponding leather sheet 19, each first heating member 24 may be adhered to the outer circumference 21a of the rim core 21.

The positions of the first heating wire 26 and the first heat conductive sheet 25 of each first heating member 24 may be reversed. In other words, the first heat conductive sheet 25 may be located inside the first heating wire 26.

The arrangement pattern of the second heating wire 34 on each second heat conductive sheet 33 is not particularly limited, and may be like a mesh.

Instead of being adhered to the inner surface of the corresponding ornamental member 31, each second heating member 32 may be adhered to the outer circumference 21a of the rim core 21.

The positions of the second heating wire 34 and the second heat conductive sheet 33 of each second heating member 32 may be reversed. In other words, the second heat conductive sheet 33 may be located inside the second heating wire 34.

Figure 6:
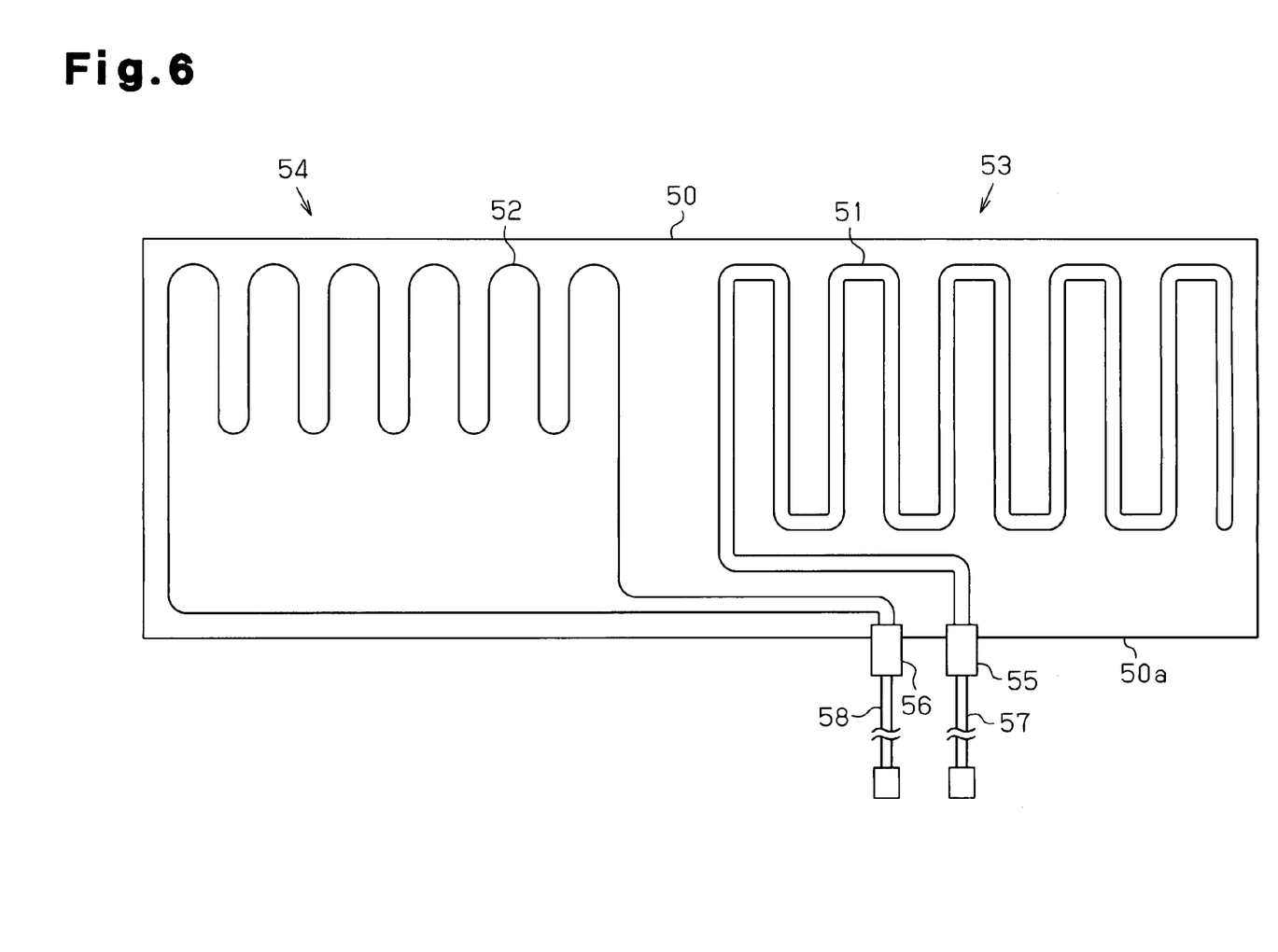
FIG. 6 is a development view showing one pair of first heater portions and second heater portions of a steering wheel according to a modification of the present invention.

The first heat conductive sheet 25 of one of the first heating members 24 and the second heat conductive sheet 33 of one of the second heating members 32 may be integrated. For example, as shown in FIG. 6, a first heating wire 51 may be sewn into a half (the right half in FIG. 6) of a heat conductive sheet 50, and a second heating wire 52 may be sewn into the other half (the left half in FIG. 6) of the same heat conductive sheet 50. In this case, half of the heat conductive sheet 50 and the first heating wire 51 form the first heating member 53, and the other half of the heat conductive sheet 50 and the second heating wire 52 form the second heating member 54. Energization of the first heating wire 51 and energization of the second heating wire 52 are performed independently from each other. This structure allows the first heating member 53 and the second heating member 54 to be easily handled together, and these are thus easily installed in a steering wheel.

In the modification shown in FIG. 6, both ends of the first heating wire 51 are connected to a first terminal 55, and both ends of the second heating wire 52 are connected to a second terminal 56. The first terminal 55 and the second terminal 56 are electrically connected to an ECU via a first electrical wire 57 and a second electrical wire 58, respectively. The first terminal 55 and the second terminal 56 are located close to each other. More specifically, the first terminal 55 and the second terminal 56 are arranged in a concentrated manner at one side 50a of the heat conductive sheet 50 that is closer to the first heating member 53. Thus, when the first heating member 53 and the second heating member 54 are installed in a steering wheel, the first terminal 55 and the second terminal 56 are both located close to the ECU. This allows the first heating member 53 and the second heating member 54 to be easy connected to the ECU.

The first temperature adjuster in each leather-covered portion 20 may be a Peltier element, instead of the first heating member 24. For example, if, in place of the first heating member 24, a Peltier element as disclosed in Japanese Laid-Open Patent Publication No. 2007-153026 is used together with a heat pipe that performs heat exchange with the Peltier element, energization of the Peltier element raises or lowers the surface temperature of the leather-covered portion 20. The direction of a current supplied to the Peltier element is opposite between the case where the surface temperature of the leather-covered portion 20 is raised and the case where it is lowered.

The second temperature adjuster in each wood-grain portion 18 may be a Peltier element, instead of the second heating member 32. For example, if, in place of the second heating member 32, a Peltier element as disclosed in Japanese Laid-Open Patent Publication No. 2007-153026 is used together with a heat pipe that performs heat exchange with the Peltier element, energization of the Peltier element raises or lowers the surface temperature of the wood-grain portion 18. The direction of a current supplied to the Peltier element is opposite between the case where the surface temperature of the wood-grain portion 18 is raised and the case where it is lowered.

The first temperature sensing elements 29 may be located outside the rim 13. In this case, each first temperature sensing element 29 may directly detect the surface temperature of the corresponding leather-covered portion 20. This structure significantly facilitates obtaining the surface temperature of each leather-covered portion 20 by the ECU 16.

The second temperature sensing elements 37 may be located outside the rim 13. In this case, each second temperature sensing element 37 may directly detect the surface temperature of the corresponding wood-grain portion 18. This structure significantly facilitates obtaining the surface temperature of each wood-grain portion 18 by the ECU 16.

The first temperature sensing elements 29 and the second temperature sensing elements 37 may have different output characteristics. In this case, when setting the first target voltage value v1 and the second target voltage value v2, the output characteristics of the first temperature sensing elements 29 and the output characteristics of the second temperature sensing elements 37 need to be taken into consideration.

The first temperature sensing elements 29 and the second temperature sensing elements 37 may be omitted. In this case, the ECU 16 controls the energization of the first heating members 24 and the second heating members 32 based on predetermined energization control patterns stored in the ROM 41. The energization control patterns stored in the ROM 41 include the quantity of electricity and the period of the energization of the first heating members 24, and the quantity of electricity and the period of the energization of the second heating members 32. When the vehicle engine is started, the ECU 16 starts controlling energization of the first heating members 24 and the second heating members 32. When a predetermined period has elapsed from the start of the energization control, the ECU 16 stops the energization control.

The surface of the first rim portions and the surface of the second rim portions in the rim 13 may be formed of the same material.

Instead of the wood-grain portions 18, the second rim portions of the rim 13 may be leather-covered portions. In this case, the leather sheets forming the surface of the second rim portions preferably has a higher thermal conductivity than the leather sheets forming the surface of the first rim portions.

The surface of the first rim portions and the surface of the second rim portions in the rim 13 may have the same thermal capacity. That is, the ornamental members 31 may have a grater thermal conductivity than that of the leather sheets 19, and the same thermal capacity as that of the leather sheets 19.

The thermal capacity of the surface of the second rim portions may be greater than the thermal capacity of the surface of the first rim portions. That is, the ornamental members 31 may have a grater thermal conductivity than that of the leather sheets 19, and a greater thermal capacity than that of the leather sheets 19.

The surface of the first rim portions and the surface of the second rim portions in the rim 13 may have the same thermal conductivity. In this case, the thermal capacity of the surface of the second rim portions is preferably greater than the thermal capacity of the surface of the first rim portions.

The encompassing member 23 of the rim core 21 may be formed of a hard material such as polypropylene.

The encompassing member 23 of the rim core 21 may be omitted. In this case, the rim core 21 is formed only by the core member 22.

The rim 13 may have a perfectly circular, oval, or polygonal in a cross section perpendicular to the center line P of the rim core 21.

The core member 22 of the rim core 21 may be formed of metal such as iron, aluminum, magnesium, and an alloy of any of these. The core member 22 may also be formed of resin.

The present invention may be applied to a steering wheel of a mobile unit other than vehicles.

The invention claimed is:

1. A steering wheel comprising:
   a rim having a surface, the rim having a first rim portion having a surface and a second rim portion having a surface, wherein a part of the rim surface is formed by the surface of the first rim portion, and at least a part of the remainder of the rim surface is formed by the surface of the second rim portion, the surface of the first rim portion having a thermal conductivity different from the thermal conductivity of the surface of the second rim portion;
   a first temperature adjuster provided inside of the surface of the first rim portion, wherein, when being energized, the first temperature adjuster adjusts the surface temperature of the first rim portion;
   a second temperature adjuster provided inside of the surface of the second rim portion, wherein, when being energized, the second temperature adjuster adjusts the surface temperature of the second rim portion;
   a control section that controls the energization of the first temperature adjuster and the energization of the second temperature adjuster independently from each other;

a first temperature sensing element that senses the temperature of the first rim portion; and a second temperature sensing element that senses the temperature of the second rim portion, wherein, in accordance with the sensed temperature of the first rim portion, the first temperature sensing element outputs a value, based on which the control section controls the energization of the first temperature adjuster, and wherein, in accordance with the sensed temperature of the second rim portion, the second temperature sensing element outputs a value, based on which the control section controls the energization of the second temperature adjuster.

2. The steering wheel according to claim 1, wherein the control section adjusts the surface temperature of the first rim portion such that it reaches a target value, and adjusts the surface temperature of the second rim portion such that it reaches the same target value.

3. The steering wheel according to claim 2, wherein the surface of the second rim portion has a greater thermal conductivity and a greater thermal capacity than those of the surface of the first rim portion, wherein the energization of the first temperature adjuster by the control section is performed with a first predetermined quantity of electricity, and the energization of the second temperature adjuster by the control section is performed with a second predetermined quantity of electricity, the second predetermined quantity of electricity being smaller than the first predetermined quantity of electricity.

4. The steering wheel according to claim 1, wherein the first temperature adjuster and the second temperature adjuster have a common heat conductive sheet, and also have a first heating wire and a second heating wire, respectively, the first and second heating wires being provided on the heat conductive sheet.

5. The steering wheel according to claim 1, wherein the first temperature adjuster and the second temperature adjuster are electrically connected to the control section with a first terminal and a second terminal, respectively, the first terminal and the second terminal being located close to each other.

* * * * *